United States Patent [19]

Nishiyama et al.

[11] Patent Number: 4,673,217
[45] Date of Patent: Jun. 16, 1987

[54] BELT ANCHOR INCORPORATING A SEAT TRACK STRUCTURE

[75] Inventors: Yuji Nishiyama; Tateo Kitano; Masakazu Hashimoto, all of Toyota, Japan

[73] Assignee: Toyota Jidosha Kabushiki Kaisha, Japan

[21] Appl. No.: 906,308

[22] Filed: Sep. 12, 1986

[30] Foreign Application Priority Data

Sep. 20, 1985 [JP] Japan .............................. 60-143584[U]

[51] Int. Cl.$^4$ ............................................. A62B 35/02
[52] U.S. Cl. ..................................... 297/473; 297/468
[58] Field of Search .................... 297/473, 468, 482; 248/429, 903, 393, 430; 280/801

[56] References Cited

U.S. PATENT DOCUMENTS

| | | | |
|---|---|---|---|
| 4,262,963 | 4/1981 | Bauer et al. | 297/473 |
| 4,482,188 | 11/1984 | Tilly et al. | 297/473 |

FOREIGN PATENT DOCUMENTS

| | | | |
|---|---|---|---|
| 2806617 | 7/1979 | Fed. Rep. of Germany | 297/473 |
| 2803896 | 8/1979 | Fed. Rep. of Germany | 297/473 |
| 2820589 | 11/1979 | Fed. Rep. of Germany | 297/473 |
| 3018811 | 11/1981 | Fed. Rep. of Germany | 297/473 |
| 3326932 | 1/1984 | Fed. Rep. of Germany | 297/473 |
| 0008957 | 1/1980 | Japan | 297/473 |
| 60-257 | 1/1985 | Japan | |

Primary Examiner—James T. McCall
Attorney, Agent, or Firm—Parkhurst & Oliff

[57] ABSTRACT

A belt anchor incorporating a seat track structure for a vehicle whereby the load applied when a emergency situation occurs is supported by the body of the vehicle through a seat mounted on the vehicle and the seat is supported on the vehicle body in such a manner as to be movable in the longitudinal direction of the vehicle. An upper rail which is rigidly secured to the seat is supported on a lower rail rigidly secured to the vehicle body in such a manner that the upper rail is movable along the lower rail in the longitudinal direction of the vehicle through first and second rotary support means. A belt anchor is rigidly secured to the upper rail, and a guide plate is rigidly secured to one edge portion of the lower rail in such a manner as to accommodate the second rotary support means defined by a plurality of balls and to clamp one edge portion of the upper rail by these balls. The other edge portion of the lower rail is formed such as to have a substantially U-shaped cross-section. One edge portion of the belt anchor is disposed within this U-shaped portion, and a slide piece is disposed between the U-shaped portion and the edge portion of the belt anchor. Accordingly, it is possible to prevent the upper and lower rails from moving relative to each other in the lateral direction of the vehicle.

20 Claims, 10 Drawing Figures

BELT ANCHOR INCORPORATING A SEAT TRACK STRUCTURE

BACKGROUND OF THE INVENTION

The present invention relates to a seat track structure employed in a seatbelt system for a vehicle designed to protect an occupant in an emergency situation. The seat track structure incorporates a belt anchor for anchoring the seatbelt system to the body of the vehicle.

In general, a seat for an occupant of a vehicle is mounted on the floor of the vehicle body through a seat track comprising a lower rail which is secured to the floor surface, and an upper rail which is secured to the seat and adapted to be slidable on the lower rail. In contrast, the inner belt of the seatbelt system is typically secured directly to the floor of the vehicle body without any relation to the seat track. Therefore, the tension generated in the webbing by the inertia acting on the occupant's body when an emergency situation of the vehicle occurs is directly supported by the floor.

There is another conventional arrangement in which the inner belt is secured to the seat so that the webbing can be fastened to the body of the occupant at a constant position at all times regardless of the occupant's adjusting the position of the seat in the longitudinal direction of the vehicle. With this arrangement, however, when an emergency situation occurs, the seat track is subjected to a large load which acts such as to separate the upper and lower rails from each other. It is therefore necessary to make the seat track more solid.

The lower rail of the seat track is generally bent at the upper edge thereof in the horizontal direction, and the upper rail is mounted on the lower rail in such a manner as to cover this bent portion of the lower rail. Therefore, in order to strengthen the seat track, it is necessary to enlarge the width of the seat track which leads to a reduction in the leg space for the occupant in the rear seat.

To overcome this problem, a structure has been proposed in which, despite the inner belt being secured to the seat, the seat track is not subjected to a large load even when an emergency situation occurs (see, e.g., Japanese Utility Model Laid-Open No. 257/1985). With this arrangement, however, it is necessary to lay a rail and the like on the vehicle body separately from the seat track, resulting in a complicated structure.

The present inventors have proposed a structure in which the seat track is arranged vertically. A load which is transmitted to the seat track from the belt anchor is supported by a retaining means which is movable in the lateral direction of the vehicle and which extends through the seat track, thereby preventing separation of the upper and lower rails (see U.S. application Ser. No. 863,423, filed May 15, 1986).

In this structure, however, the retaining means is disposed below the seat, and this disadvantageously reduces the degree of freedom with which the configuration of the seat cushion frame is designed.

SUMMARY OF THE INVENTION

In view of the above-described circumstances, it is a first object of the present invention to provide a belt anchor incorporating a seat track structure which enables a reduction in the width of the rails of the seat track and yet allows an increase in the strength.

It is a second object of the present invention to provide a belt anchor incorporating a seat track structure which enables a reduction in the width of the rails of the seat track and which allows an increase in the degree of freedom with which the configuration of the seat cushion frame is designed.

To these ends, according to a first feature of the present invention, there is provided a belt anchor incorporating a seat track structure for a vehicle designed to support a seat on the body of the vehicle in such a manner that the seat is movable in the longitudinal direction of the vehicle, which comprises: a seat track having a lower rail rigidly secured to the vehicle body, and an upper rail movable along the lower rail in the longitudinal direction of the vehicle through a first and a second rotary support means; a belt anchor rigidly secured to the upper rail; a reinforcement member rigidly secured to the seat and the upper rail as well as to the belt anchor in order to reinforce the strength of these members; a guide plate rigidly secured to one edge portion of the lower rail in such a manner as to retain the second rotary support means between the guide plate and one edge portion of the upper rail and to prevent a first edge portion of the lower rail and a first edge portion of the upper rail from moving relative to each other in the lateral direction of the vehicle; a slide member disposed in a space defined between a substantially U-shaped bent portion formed at the other edge portion of the lower rail, one edge portion of the belt anchor being positioned within the bent portion, so as to prevent the belt anchor and the bent portion from moving relative to each other in the lateral direction of the vehicle; and retaining means supported by the reinforcement member and adapted to be selectively received through a plurality of bores formed in the lower rail at predetermined spacings along the longitudinal direction of the vehicle for the purpose of retaining the seat at a given position.

By virtue of the above-described arrangement, the load which acts on the belt anchor when an emergency situation occurs is not concentrated on the seat track and the belt anchor securing portion but is dispersed or distributed to the seat retaining means and the bent portion of the lower rail. Therefore, the load can reliably be transmitted to the body of the vehicle without any danger of the seat track being separated into the upper and lower rail.

In addition, since the rotary support means are supported at four sides thereof in the lateral and vertical directions of the vehicle by the guide plate and the bent portion, the upper rail can slide smoothly without any play or chattering.

According to a second aspect of the present invention, the above-described plurality of bores are positioned at substantially the same height in the vertical direction of the vehicle as that of the first rotary support means, and the retaining means has a lock pin which is selectively received through the bores, and biasing means for biasing the lock pin in a position in which it is selectively received through the bores.

Thus, the retaining means is disposed in a relatively narrow space defined between the seat cushion frame and the floor surface of the vehicle body. Accordingly, it is possible to increase the degree of freedom with which the configuration of the seat cushion frame is designed.

DETAILED DESCRIPTION OF THE INVENTION

The belt anchor incorporating a seat track structure according to the present invention will be described hereinafter in detail with reference to the accompanying drawings.

Figure 1:
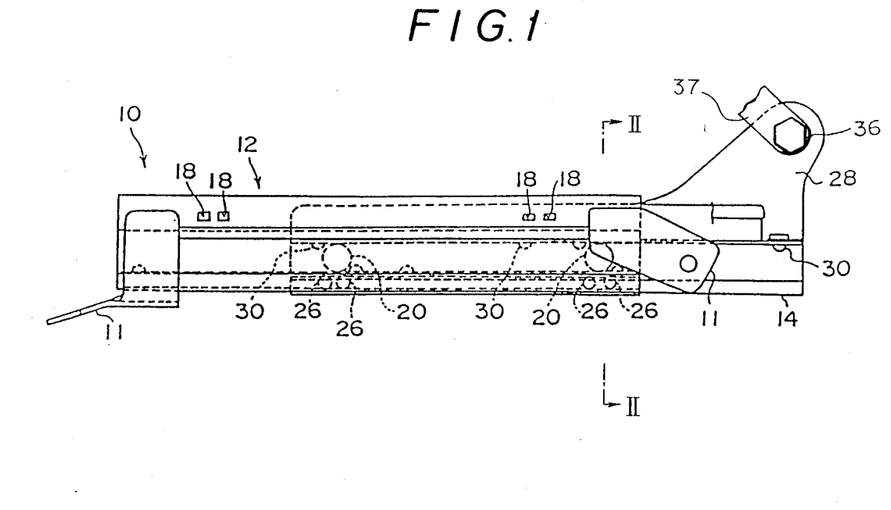
FIG. 1 is a side view of a belt anchor incorporating a seat track structure in accordance with a first embodiment of the present invention.
Figure 2:
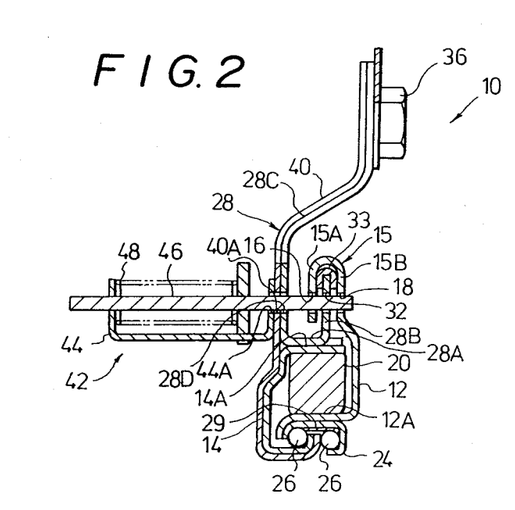
FIG. 2 is a sectional view taken along the line II—II in FIG. 1.

FIGS. 1 and 2 show in combination a seat track 10 in accordance with a first embodiment of the present invention.

The seat track 10 has a lower rail 12 which is rigidly secured to the body of a vehicle through a bracket 11 and an upper rail 14 which is rigidly secured to a seat provided on the vehicle. These rails 12 and 14 are adapted to move relative to each other in the longitudinal direction of the vehicle, thus allowing the seat to move in this direction.

The lower rail 12 is, as shown in FIG. 2, bent so as to have a substantially L-shaped cross-section. The edge portion of the vertical portion of the lower rail 12 is bent so as to provide a bent portion 15 having a U-shaped cross-section, the distal end of the bent portion 15 facing the floor surface of the vehicle body.

The parallel portions 15A, 15B of the bent portion 15 are respectively provided with a plurality of rectangular bores 16, 18 which are coaxial with each other.

A plurality of rollers 20 which define first rotary support means are disposed on the bottom portion 12A of the lower rail 12, the upper rail 14 being supported on the lower rail 12 through the rollers 20.

The upper rail 14 is bent in an L-shape in cross-section so as to surround the rollers 20 together with the lower rail 12. The lower edge portion of the upper rail 14 is bent in such a manner as to pass around below the bottom portion 12A of the lower rail 12 so as to overlap the lower rail 12. In addition, a guide plate 24 which has a substantially U-shaped cross-section is rigidly secured to the lower side of the overlapping portion of the lower rail 12, the guide plate 24 having both lateral edge portions extending toward the lower side of the vehicle. The distal edge portion of the upper rail 14 is bent so as to extend substantially upward, so as to be accommodated in the central portion of the guide plate 24.

A plurality of balls 26 which define second rotary support means are accommodated in each of the spaces which are defined between both bent lateral edge portions of the guide plate 24 and the upwardly extending edge portion of the upper rail 14 which enters the area defined between these bent lateral edge portions.

The balls 26 serve to prevent occurrence of play or chattering between the lower and upper rails 12, 14 and to enhance the slidability of the upper rail 14 which is mainly offered by the rollers 20.

Figure 4A:
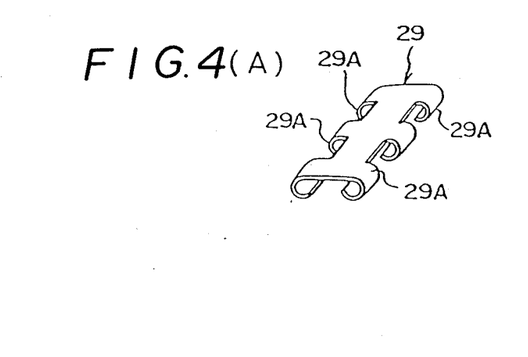
FIGS. 4A and 4B are perspective views of the retainer employed in the embodiment of FIG. 3.

It should be noted that a retainer 29 shown in FIG. 4A is disposed around the balls 26 in such a manner that the balls 26 are respectively accommodated within notched portions 29A in the retainer 29 so as to be retained in position.

The base portion 28A of the belt anchor 28 which is defined by the intermediate portion thereof is secured to the upper flat portion 14A of the upper rail 14 by means of caulking pins 30 (see FIG. 1) or, for example, welding.

A pair of parallel leg plates 28B, 28C extend upwardly from the two lateral edges of the base portion 28A. The leg plate 28B is inserted into the area between the parallel portions 15A, 15B of the bent portion 15 of the lower rail 12. A rectangular bore 32 is provided in the edge portion of the leg plate 28B in such a manner that the bore 32 can be made coaxial with the rectangular bores 16, 18 by moving the upper rail 14 in the longitudinal direction of the vehicle. In addition, a slide piece 33 which serves as a slide member is fitted over the distal edge of the leg plate 28B, and the parallel portions 15A, 15B clamps both lateral sides of the leg plate 28B through this slide piece 33.

The other leg plate 28C is bent at its intermediate portion so that the leg plate 28C as a whole has a substantially S-shaped cross-section. One end of an inner belt 37 is connected to the upper end portion of the leg plate 28C by means of a nut 36 which is rigidly secured to the upper end portion of the leg plate 28C.

The end face of the leg plate 28C of the belt anchor 28 has, as shown in FIG. 1, a triangular shape one of the vertices of which is defined by the end portion thereof which is connected to the inner belt 37. Thus, the load which is transmitted from the inner belt 37 is transmitted to the vehicle body while being dispersed in the longitudinal direction of the vehicle.

It should be noted that the other end of the inner belt 37 is provided with a buckle device.

The lower portion of each of the caulking pins 30 which secure the belt anchor 28 to the upper rail 14 has a circular cross-section and is disposed on the locus of movement of the rollers 20.

Accordingly, the range within which the rollers 20 can move is limited by installing the caulking pins 30 at given positions, and the upper rail 14 is thereby prevented from coming off the lower rail 12.

The seat track 10 arranged as detailed above is rigidly secured to the seat through a reinforcement member 40.

The reinforcement member 40 is rigidly secured to the upper rail 14 and the belt anchor 28 in such a manner that the reinforcement member 40 extends vertically along them. In addition, a lock mechanism 42 which serves as retaining means is mounted on the reinforcement member 40.

The lock mechanism 42 is rigidly secured to the reinforcement member 40 through a bracket 44. The lock mechanism 42 has a lock pin 46 and a compression coil spring 48. The lock pin 46 is normally biased by the compression coil spring 48 so as to extend horizontally through the rectangular bores 16, 18, 32, 44A, 40A and 28D. The arrangement is such that, when the occupant actuates a lever (not shown), the lock pin 46 is axially moved against the biasing force from the compression coil spring 48, so that the lock pin 46 can be removed from the rectangular bores 16, 18 and 32. There are a plurality of rectangular bores 16, 18 arranged at appropriate spacings in the longitudinal direction of the vehicle.

When an emergency situation occurs, the load which acts on the belt anchor 28 is transmitted to the reinforcement member 40 through the lock pin 46, thereby preventing an excessively large load from acting on the upper rail 14.

The following is a description of the operation of this embodiment.

When the vehicle is in a normal state, the lock pin 46 of the lock mechanism 42 is received through the rectangular bores 16, 18 and 32, and the seat is thereby prevented from moving in the longitudinal direction of the vehicle.

To move the seat, the occupant actuates the lever (not shown) in such a manner that the lock pin 46 is axially moved against the biasing force from the compression coil spring 48 so as to be temporarily removed from the rectangular bores 16, 18 and 32, thereby allowing the upper rail 14 to move relative to the lower rail 12 and thus enabling the occupant to dispose the seat at any desired position.

In this case, the balls 26 are supported by the guide plate 24 and the upper rail 14 at four sides thereof in the lateral and vertical directions of the vehicle, while the slide piece 33 is supported by the bent portion 15 at two sides thereof in the lateral direction of the vehicle, and the seat track 10 is thereby retained at the upper and lower ends thereof. Accordingly, the upper rail 14 can slide smoothly without any play or chattering.

When the vehicle runs into an emergency situation, the inertia which acts on the occupant's body causes the belt anchor 28 to be loaded. However, since the belt anchor 28 has a triangular shape, one of the vertices of which is defined by the joint between the belt anchor 28 and the inner belt 37, the load which acts on the belt anchor 28 is transmitted to the upper rail 14 while being dispersed in the longitudinal direction of the vehicle, and the load is further transmitted to the lower rail 12 through the balls 26 at the portion of the upper rail 14 which overlaps the lower rail 12. There is therefore no danger of the upper rail 14 being separated from the lower rail 12.

In addition, since a part of the load can be transmitted directly to the lower rail 12 through the lock pin 46 which is horizontally received in the lower rail 12, the upper rail 14 is not heavily loaded. Accordingly, the width of the seat track can be made smaller than that of the conventional seat track, so that it is possible to enlarge the leg space for the occupant in the rear seat.

Figure 3:
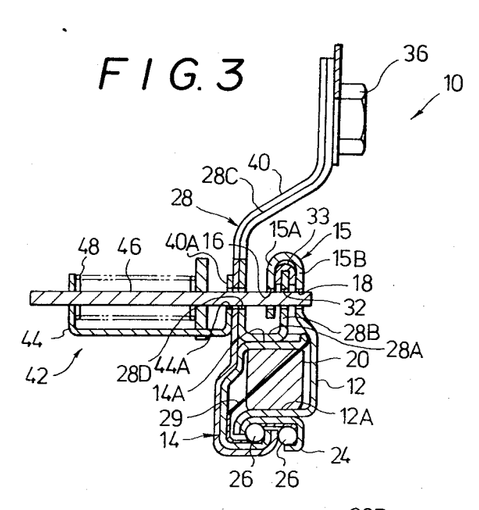
FIG. 3 is a sectional view corresponding to FIG. 2, which shows the seat track structure in the case where a retainer is provided around the rollers.
Figure 4B:
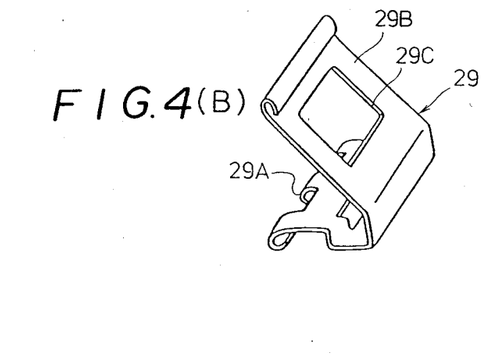

It should be noted that, although the retainer 29 is disposed only around the balls 26 in the embodiment, the arrangement may be such that, as shown in FIGS. 3 and 4B, retainer 29 can extend so as to define an extended portion 29B, and each of the rollers 20 can be accommodated within a notched portion 29C provided in the extended portion 29B. In such case, it is possible to advantageously reduce the number of required parts.

Figure 5:
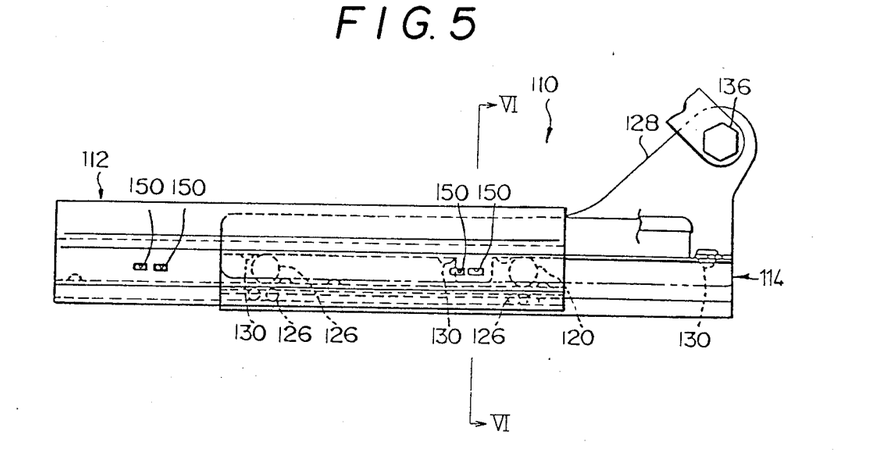
FIG. 5 is a side view of a belt anchor incorporating a seat track structure in accordance with a second embodiment of the present invention.
Figure 6:
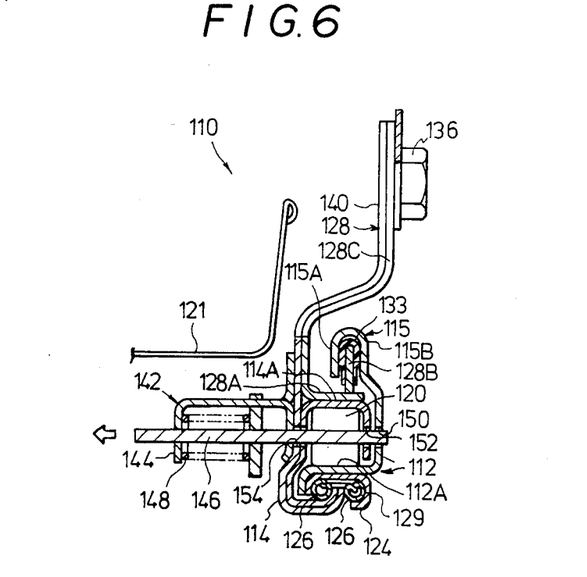
FIG. 6 is a sectional view taken along the lines VI—VI in FIG. 5.

FIGS. 5 and 6 show in combination a seat track 110 in accordance with a second embodiment of the present invention.

The seat track 110 has a lower rail 112 which is rigidly secured to the body of a vehicle and an upper rail 114 which is rigidly secured to a seat provided on the vehicle. These rails 112 and 114 are adapted to move relative to each other in the longitudinal direction of the vehicle, thus allowing the seat to move in this direction.

The lower rail 112 is, as shown in FIG. 6, bent so as to have a substantially L-shaped cross-section. The edge portion of the vertical portion of the lower rail 112 is bent so as to provide a bent portion 115 having a U-shaped cross-section, the distal edge of the bent portion 115 facing the floor surface of the vehicle body.

A plurality of rollers 120 which define first rotary support means are disposed on the bottom portion 112A of the lower rail 112, the upper rail 114 being supported on the lower rail 112 through the rollers 120. The rollers 120 are disposed in such a manner that the axes thereof extend through a relatively narrow space defined between the floor surface of the vehicle body and a seat cushion frame 121.

The upper rail 114 is bent in a U-shaped in cross-section so as to surround the rollers 120 together with the lower rail 112. The lower edge portion of the upper rail 114 is bent in such a manner as to pass around below the bottom portion 112A of the lower rail 112 so as to overlap the lower rail 112. In addition, a guide plate 124 which has a substantially U-shaped cross-section is rigidly secured to the lower side of the overlapping portion of the lower rail 112, the guide plate 124 has both lateral edge portions extending toward the lower side of the vehicle. The distal edge portion of the upper rail 114 is bent so as to extend substantially upward, so as to be accommodated in the central portion of the guide plate 124.

A plurality of balls 126 which define second rotary support means are accommodated in each of the spaces which are defined between both bent lateral edge portions of the guide plate 124 and the upwardly extending edge portion of the upper rail 114 which enters the area defined between these bent lateral edge portions. The balls 126 serve to prevent play or chattering between the lower and upper rails 112, 114 and to enhance the slidability of the upper rail 114 which is mainly offered by the rollers 120.

Figure 8:
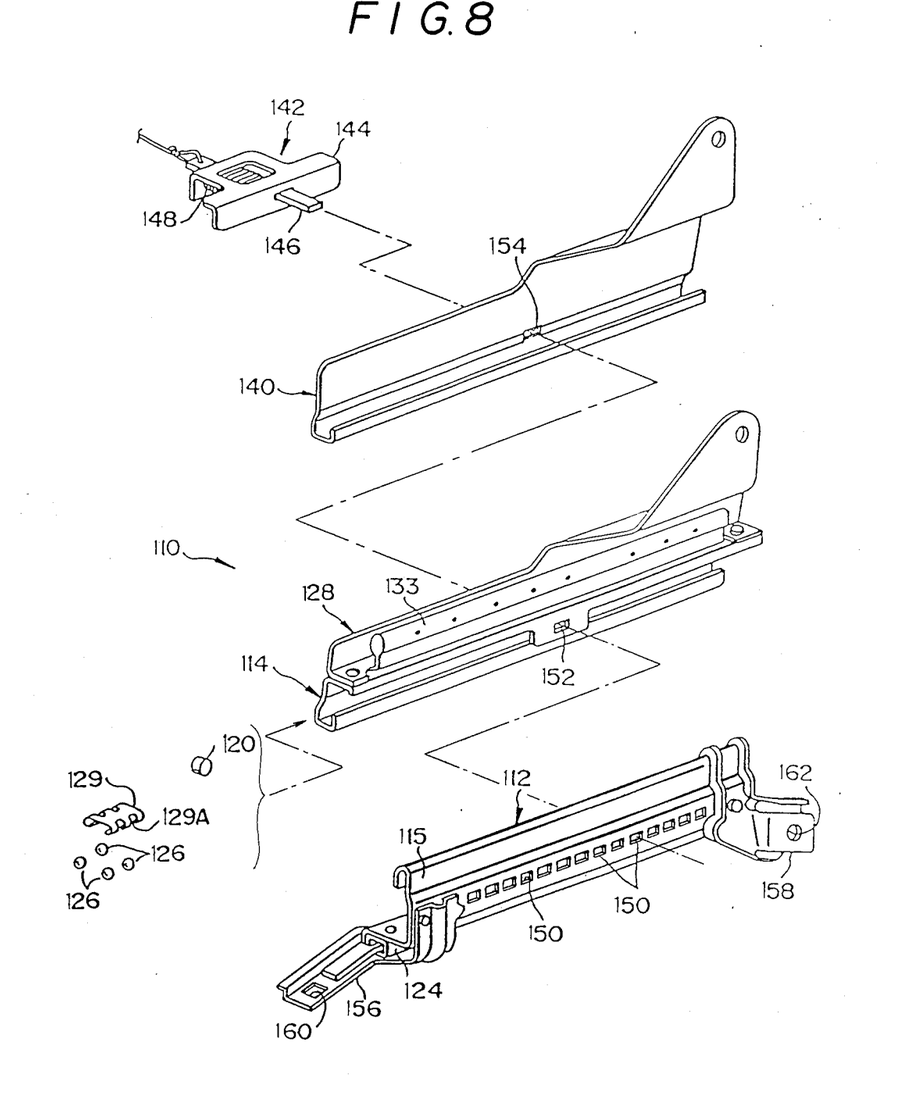
FIG. 8 is an exploded perspective view of the seat track structure in accordance with the second embodiment.

It should be noted that a retainer 129 is disposed around the balls 126 in such a manner that the balls 126 are respectively accommodated within notched portions 129A in the retainer 129 so as to be retained in position (see FIG. 8).

The base portion 128A of the belt anchor 128 which is defined by the intermediate portion thereof is secured to the upper flat portion 114A of the upper rail 114 by means of caulking pins 130 (see FIG. 5.).

A pair of parallel leg plates 128B, 128C extend upwardly from the two lateral ends of the base portion 128A. The leg plate 128B is inserted into the area between the parallel portions 115A, 115B of the bent portion 115 of the lower rail 112. In addition, a slide piece 133 which serves as a slide member is fitted over the distal edge of the leg plate 128B, and the parallel portions 115A, 115B clamps both lateral sides of the leg plate 128B through this slide piece 133.

The other leg plate 128C is bent at its intermediate portion so that the leg plate 128C as a whole has a substantially S-shaped cross-section. One end of an inner belt 134 (see FIG. 7) is connected to the upper end portion of the leg plate 128C by means of a bolt 136.

The end face of the leg plate 128C of the belt anchor 128 has, as shown in FIG. 5, a triangular shape one of the vertices of which is defined by the end portion thereof which is connected to the inner belt 134. Thus, the load which is transmitted from the inner belt 134 is transmitted to the vehicle body while being dispersed in the longitudinal direction of the vehicle.

It should be noted that the other end of the inner belt 134 is provided with a buckle device and mounted on one side surface of the seat.

The lower portion of each of the caulking pins 130 which secure the belt anchor 128 to the upper rail 114 has a circular cross-section and is disposed on the locus of movement of the rollers 120.

Accordingly, the range within which the rollers 120 can move is limited by installing the caulking pins 130 at given positions, and the upper rail 114 is thereby prevented from coming off the lower rail 112.

The seat track 110 arranged as detailed above is rigidly secured to the seat through a reinforcement member 140.

The reinforcement member 140 is rigidly secured to the upper rail 114 and the belt anchor 128 in such a manner that the reinforcement member 140 extends vertically along them. In addition, a lock mechanism 142 which serves as retaining means is mounted on the reinforcement member 140.

The lock mechanism 142 is rigidly secured to the reinforcement member 140 through a bracket 144. The lock mechanism 142 has a lock pin 146 and a compression coil spring 148. The lock pin 146 is normally biased by the compression coil spring 148 so as to extend horizontally through the rectangular bores 150, 152 and 154 respectively provided in the lower rail 112, the upper rail 114 and the reinforcement member 140. It should be noted that the axis of the lock pin 146 extends parallel to the axes of the rollers 120 and at the same height from the floor surface as that of the latter.

There are a plurality of rectangular bores 150 provided along the longitudinal direction of the vehicle, and the lock pin 146 is adapted to be selectively inserted through these bores.

The arrangement is such that, when the occupant actuates a lever (not shown), the lock pin 146 is axially moved against the biasing force from the compression coil spring 148, so that the lock pin 146 can be removed from the rectangular bores 150, 152 and 154.

When an emergency situation occurs, the load which acts on the belt anchor 128 is transmitted to the reinforcement member 140 through the lock pin 146, thereby preventing an excessively large load from acting on the upper rail 114.

Figure 7:
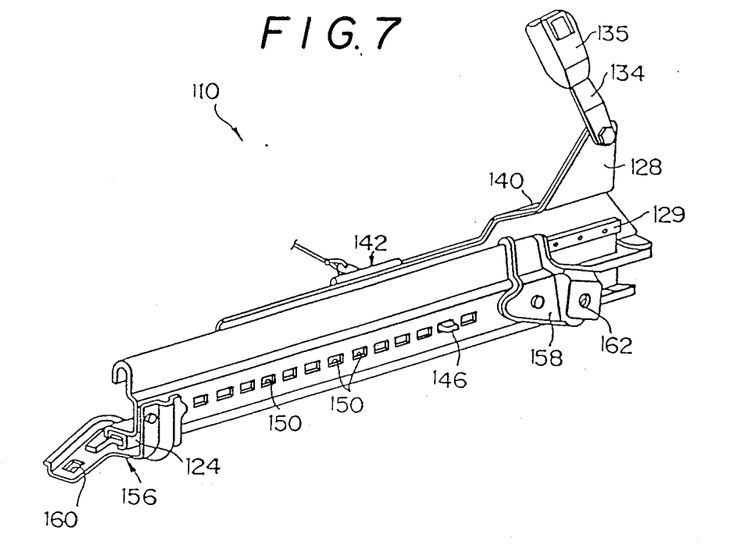
FIG. 7 is a perspective view of the seat track structure in accordance with the second embodiment.

The seat track 110 arranged as detailed above is secured to the vehicle body at the front and rear end portions (as viewed in the longitudinal direction of the vehicle) through brackets 156 and 158, respectively, as shown in FIGS. 7 and 8. The bracket 156 is adapted to support the portion of the seat track 110 on the side thereof which is closer to the front end of the vehicle. The bracket 156 has a substantially L-shaped configuration in plan view. One end portion of the bracket 156 is bent so as to extend toward the upper side of the vehicle, and rigidly secured to the lower rail 112 over a relatively wide area from the lower surface to the side surface of the lower rail 112. The other end portion of the bracket 156 has a bore 160 provided in the distal end portion thereof and rigidly secured to the vehicle body through a bolt (not shown) which is received through the bore 160.

The end portion of the other bracket 158 on the side thereof which is closer to the upper side of the vehicle is bent so as to have a substantially U-shaped cross-section, and rigidly secured along the outer periphery of the bent portion 115 formed on the lower rail 112. The other end portion of the bracket 158 is bent so as to extend toward the rear end of the vehicle, and a bore 162 is provided in the distal end portion thereof. Thus, the bracket 158 is rigidly secured to the vehicle body through a bolt (not shown) which is received through the bore 162.

The following is a description of the operation of this embodiment.

When the vehicle is in a normal state, the lock pin 146 of the lock mechanism 142 is received through the rectangular bores 150, 152 and 154, and the seat is thereby retained.

The axes of the rectangular bores 150, 152 and 154 and the axis of the lock pin 146 which is received through these bores are positioned at the same height as that of the axes of the rollers 120, and the lock mechanism 142 can be accommodated in a relatively narrow space defined between the seat cushion frame 121 and the floor surface of the vehicle body, which allows an increase in the degree of freedom with which the configuration of the seat cushion frame 121 is designed.

To move the seat, the occupant actuates the lever (not shown) in such a manner that the lock pin 146 is axially moved against the biasing force from the compression coil spring 148 so as to be temporarily removed from the rectangular bores 150, 152 and 154, thereby allowing the upper rail 114 to move relative to the lower 112 and thus enabling the occupant to dispose the seat at any desired position.

In this case, the balls 126 are supported by the guide plate 124 and the upper rail 114 at four sides thereof in the lateral and vertical directions of the vehicle, while the slide piece 133 is supported by the bent portion 115 at two sides thereof in the lateral direction of the vehicle, and the seat track 110 is thereby retained at the upper and lower ends thereof. Accordingly, the upper rail 114 can slide smoothly without any play or chattering.

When the vehicle runs into an emergency situation, the inertia which acts on the occupant's body causes the belt anchor 128 to be loaded. However, since the belt anchor 128 has a triangular, one of the vertices of which is defined by the joint between the belt anchor 128 and the inner belt 134, the load which acts on the belt anchor 128 is transmitted to the upper rail 114 while being dispersed in the longitudinal direction of the vehicle, and the load is further transmitted to the lower rail 112 through the balls 126 at the portion of the upper rail 114 which overlaps the lower rail 112. There is therefore no danger that the upper rail 114 will be separated from lower rail 112.

Since the bracket 158 is rigidly secured along the bent portion 115 of the lower rail 112, a part of the load which acts on the belt anchor 128 is transmitted directly to the bracket 158, and this allows a reduction in the size of the caulking pins 130 employed to retain the belt anchor 128 to the upper rail 114.

In addition, since a part of the load can be transmitted directly to the lower rail 112 through the lock pin 146 which is horizontally received in the lower rail 112, the upper rail 114 is prevented from being heavily loaded. Accordingly, the width of the seat track can be made smaller than that of the conventional seat track, so that it is possible to enlarge the leg space for the occupant in the rear seat.

Figure 9:
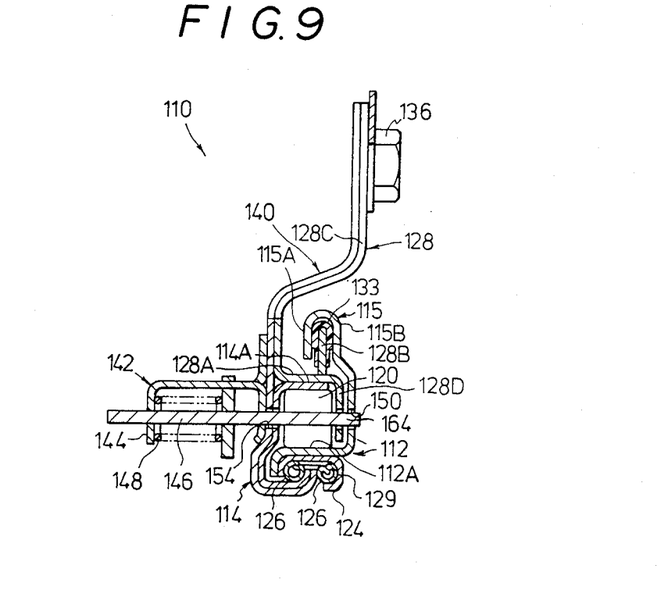
FIG. 9 is a sectional view corresponding to FIG. 6, which shows the seat track structure in accordance with the second embodiment in the case where the lower edge portion of the belt anchor is extended downward.

It should be noted that, although in this embodiment the upper rail 114 is formed such as to have a substantially U-shaped configuration and disposed around the rollers 120, the arrangement may be such that the lower end portion of the belt anchor 128 is extended so as to be disposed between the rollers 120 and the lower rail 112 as shown in FIG. 9. In this case, a rectangular bore 164 is provided in the extended portion 128D of the bent anchor 128 so as to oppose the rectangular bores 150, 152 and 154.

What is claimed is:

1. A belt anchor incorporating a seat track structure for a vehicle designed to support a seat on the body of the vehicle in such a manner that said seat is movable in the longitudinal direction of the vehicle, comprising:
    a seat track having a lower rail rigidly secured to the vehicle body, and an upper rail movable along said lower rail in the longitudinal direction of the vehicle through first and second rotary support means;
    a belt anchor rigidly secured to said upper rail;
    a reinforcement member rigidly secured to the seat and said upper rail as well as to said belt anchor for reinforcing the strength of these members;
    a guide plate rigidly secured to a first edge portion of said lower rail in such a manner as to retain said second rotary support means between said guide plate and a first edge portion of said upper rail and to prevent said first edge portion of said lower rail and said first edge portion of said upper rail from moving relative to each other in the lateral direction of the vehicle;
    a slide member disposed in a space defined between a substantially U-shaped bent portion formed at a second edge portion of said lower rail, a first edge portion of said belt anchor being positioned within said bent portion, so as to prevent said belt anchor and said bent portion from moving relative to each other in the lateral direction of the vehicle;
    retaining means supported by said reinforcement member and adapted to be selectively received through a plurality of bores formed in the lower rail at predetermined spacings along the longitudinal direction of the vehicle for retaining said seat at a given position; and
    whereby a load which acts on said belt anchor when a emergency situation occurs is transmitted to said lower rail through said retaining means, and said lower and upper rails are prevented from moving relative to each other in the lateral direction of the vehicle by virtue of said slide member and said guide plate.

2. A belt anchor incorporating a seat track structure according to claim 1, wherein said second rotary support means is defined by a plurality of balls disposed on both sides of said first edge portion of said upper rail.

3. A belt anchor incorporating a seat track structure according to claim 2, wherein said slide member comprises a slide piece which has a substantially U-shaped cross-section so as to clamp said first edge portion of said belt anchor and which is clamped by said bent portion of said lower rail.

4. A belt anchor incorporating a seat track structure according to claim 3, wherein said plurality of bores are formed in said lower edge portion of said lower rail, said retaining means having a lock pin which is selectively received through said bores, and biasing means for biasing said lock pin in a direction in which it is selectively received through said bores.

5. A belt anchor incorporating a seat track structure according to claim 3, wherein said plurality of bores are positioned at substantially the same height in the vertical direction of the vehicle as that of said first rotary support means, said retaining means having a lock pin which is selectively received through said bores, and biasing means for biasing said lock pin in a direction in which it is selectively received through said bores.

6. A belt anchor incorporating a seat track structure according to claim 2, wherein each of said plurality of balls is accommodated in each of a plurality of notched portions formed in a retainer supporter by said guide plate and thereby retained in position.

7. A belt anchor incorporating a seat track structure according to claim 2, wherein said first rotary support means is defined by a roller disposed in a space between said first edge portion of said lower rail and said second edge portion of said upper rail.

8. A belt anchor incorporating a seat track structure according to claim 7, further comprising a retainer having one portion thereof disposed within said guide plate, said retainer being provided with notched portions respectively accommodating said balls, another portion of said retainer extending toward said first edge portion of said upper rail and being provided with a rectangular bore for accommodating said roller.

9. A belt anchor incorporating a seat track structure according to claim 4, wherein said lock pin extends through a bore formed in said first edge portion of said belt anchor.

10. A belt anchor incorporating seat track structure according to claim 5, wherein said lock pin extends through a bore formed in said upper rail.

11. A belt anchor incorporating a seat track structure for a vehicle wherein a load applied when an emergency situation occurs is supported by a body of the vehicle through a seat mounted on the vehicle, the seat being supported on the vehicle body in such a manner as to be movable in the longitudinal direction of the vehicle, comprising:
    a lower rail rigidly secured to the vehicle body and extending in longitudinal direction of the vehicle;
    an upper rail extending along said lower rail in the longitudinal direction of the vehicle;
    first and a second rotary support means for enabling said upper rail to move relative to said lower rail in the longitudinal direction of the vehicle;
    a belt anchor having a substantially triangular shape, one of the vertices of which is defined by a first portion thereof which is connected to an inner belt, said belt anchor being ridigly secured to said upper rail;
    a reinforcement member rigidly secured to said seat and said upper rail and to said belt anchor for reinforcing the strength of these members;
    a guide plate rigidly secured to a first edge portion of said lower rail in such a manner as to retain said second rotary support means between said guide plate and a first edge portion of said upper rail and to prevent said first edge portion of said lower rail and said first edge portion of said upper rail from moving relative to each other in the lateral direction of the vehicle;

a slide member disposed in a space defined between a substantially U-shaped bent portion formed at a second edge portion of said lower rail and a second edge portion of said belt anchor which is positioned within the bent portion, so as to prevent said belt anchor and said bent portion from moving relative to each other in the lateral direction of the vehicle; and retaining means supported by said reinforcement member and selectively received through a plurality of bores formed in said lower rail at predetermined spacings along the longitudinal direction of the vehicle for the purpose of retaining the seat at a given position;

whereby a load which acts on said belt anchor when an emergency situation occurs is transmitted to said lower rail through said retaining means, and said lower and upper rails are prevented from moving relative to each other in the lateral direction of the vehicle by virtue of said slide member and said guide plate.

12. A belt anchor incorporating a seat track structure according to claim 11, wherein said second rotary support means is defined by a plurality of balls disposed on both sides of said first edge portion of said upper rail.

13. A belt anchor incorporating a seat track structure according to claim 12, wherein said slide member is a slide piece which has a substantially U-shaped cross-section so as to clamp said first edge portion of said belt anchor and which is clamped by said bent portion of said lower rail.

14. A belt anchor incorporating a seat track structure according to claim 13, wherein said plurality of bores are formed in said lower edge portion of said lower rail, said retaining means having a lock pin which is selectively received through said bores, and biasing means for biasing said lock pin in a direction in which it is selectively received through said bores.

15. A belt anchor incorporating a seat track structure according to claim 13, wherein said plurality of bores are positioned at substantially the same height in the vertical direction of the vehicle as that of said first rotary support means, said retaining means having a lock pin which is selectively received through said bores, and biasing means for biasing said lock pin in a direction in which it is selectively received through said bores.

16. A belt anchor incorporating a seat track structure according to claim 12, wherein each of said plurality of balls is accommodated in each of a plurality of notched portions formed in a retainer supported by said guide plate and thereby retained in position.

17. A belt anchor incorporating a seat track structure according to claim 12, wherein said first rotary support means comprises a roller disposed in a space between said first edge portion of said lower rail and said second edge portion of said upper rail.

18. A belt anchor incorporating a seat track structure according to claim 17, further comprising a retainer having one portion thereof disposed within said guide plate, said retainer being provided with notched portions respectively accommodating said balls, another portion of said retainer extending toward said first edge portion of said upper rail and being provided with a rectangular bore for accommodating said roller.

19. A belt anchor incorporating a seat track structure according to claim 14, wherein said lock pin extends through a bore formed in said first edge portion of said belt anchor.

20. A belt anchor incorporating a seat track structure according to claim 15, wherein said lock pin extends through a bore formed in said upper rail.

* * * * *